UNITED STATES PATENT OFFICE.

ORLANDO SHEPPARD, JR., OF ASHBURN, GEORGIA.

STOCK FOOD.

1,199,622. Specification of Letters Patent. Patented Sept. 26, 1916.

No Drawing. Application filed April 20, 1916. Serial No. 92,545.

*To all whom it may concern:*

Be it known that I, ORLANDO SHEPPARD, Jr., a citizen of the United States, residing at Ashburn, in the county of Turner and State of Georgia, have invented new and useful Improvements in Stock Food, of which the following is a specification.

This invention relates to improvements in stock food.

The principal objects of the invention are to provide a stock food in which the protein and carbohydrates are in the proportions necessary for a balanced ration and which shall have such form that it will be palatable, readily digested and permanently homogeneous. A further object of the invention is to provide a stock food having cotton seed hull bran as an ingredient wherein the bran is in a novel, very palatable, and readily digested form.

The principal objection to stock foods in the form of mash, and which consist of a mixture of bran and meal, is that, in feeding, one of the constituents of the mixture may be rejected in favor of the other. This is due to the fact that the meal will settle to the bottom of the mass where it may be eaten separately or rejected in favor of the bran accordingly as the meal or the bran is the more palatable or the more accessible. This objection obtains particularly in the case of mash made from cotton seed products, *i. e.*, from a mixture of cotton seed hull bran and cotton seed meal. In such a mash, if the bran is coarse and heavy, it is unpalatable and indigestible and it will be rejected in favor of the meal which settles to the bottom of the mass; or, if the bran be reduced to sufficient fineness to render it more palatable, (without, however, materially aiding its digestibility), it may be consumed and the meal which settles to the bottom of the mass rejected. In any event, therefore, the result will be that no matter how carefully the constituents of the mixture may be proportioned to provide a balanced ration, too great a quantity of one constituent and too small a quantity of the other will be consumed and indigestion and lack of proper nourishment will result.

The stock food which constitutes the present invention is in the form of light thin flakes and preferably consists of a carbohydrate supplying bran and a protein supplying meal which, when rolled under pressure with the bran has a physical affinity therefor; whereby each flake is a dry permanent magma or mat of the bran and meal.

The improved stock food is preferably composed of bran made from cotton seed hull and cotton seed meal. It is known that these products, when combined in the right proportions, will provide a theoretically ideal stock feeding mixture, the meal furnishing the necessary protein and the bran furnishing the carbohydrates. But in addition to their food value, I have found that they have a pronounced physical affinity for one another by virtue of which they are especially adapted for the present invention, wherein, as stated, the food has the form of light, thin flakes. In this preferred embodiment of the invention, the flakes, regardless of their size, are dry permanent magmas or mats of the cotton seed meal and the bran made from cotton seed hull, and the food composed of such flakes is homogeneous and in lightness compares favorably with forage. It is much more palatable and digestible than an ordinary mash of cotton seed meal and cotton seed hull bran and its constituents are so combined that neither of them can be rejected in favor of the other. The food will always retain its flaky form and will not disintegrate into a fine powder or meal. Properly sealed and with ordinary precautions, it will keep indefinitely.

The flakes are very thin and flat and ordinarily range in size from a quarter of an inch square to an inch square, more or less, and the bran and cotton seed meal will be matted together and permanently adherent in each flake.

In my co-pending application Serial No. 92544 I have disclosed a process for the manufacture of the food herein described. This process, briefly stated, consists in thoroughly mixing the bran which is preferably relatively coarse and, when obtained from the hulls of cotton seed, is preliminarily treated to substantially free it from the cotton seed fiber, with a meal which will supply the proper proportion of protein and will have a pronounced physical affinity for the bran, in certain definite and predetermined proportions and in passing the mixture through rollers by which it is formed into the relatively light and coarse flakes above referred to.

In some cases, flakes of larger size, say two or three inches square, may be desired, and for this purpose, steam is introduced into the mixed ingredients prior to their formation into flakes.

In some cases, it may be desired to incorporate molasses into the food for the sake of its laxative properties and also to increase the percentage of carbohydrates. For this purpose, the molasses is put into solution with steam and the steam and molasses is introduced into the food prior to its formation into flakes.

In some cases, it may be desired to have the flakes composed of lintless cotton seed hull bran without the meal and with or without the addition of molasses as described. Such flakes will be very light and thin, palatable and readily digested, but will be considerably smaller in area than the flakes wherein the bran and the meal are matted together.

I claim:

1. A stock food of homogeneous character consisting of light, thin flakes, wherein each flake is a dry permanent magma or mat of a carbohydrate supplying bran and a protein supplying meal having a physical affinity for the bran.

2. A stock food of homogeneous character consisting of light, thin flakes wherein each flake is a dry permanent magma or mat of cotton seed hull bran substantially free from lint and cotton seed meal.

3. A stock food of homogeneous character wherein cotton seed hull bran substantially free from lint is in the form of light thin flakes.

4. A stock food of homogeneous character wherein cotton seed hull bran substantially free from lint is in the form of light thin flakes and has molasses combined therewith prior to its formation into flakes.

In testimony whereof I have hereunto set my hand in presence of two subscribing witnesses.

ORLANDO SHEPPARD, Jr.

Witnesses:
CHAS. S. HYER,
JOHN S. POWERS.

Copies of this patent may be obtained for five cents each, by addressing the "Commissioner of Patents, Washington, D. C."